United States Patent [19]

Schwandt et al.

[11] 4,174,129
[45] Nov. 13, 1979

[54] WINDOW LATCH

[75] Inventors: Marvin W. Schwandt, Brighton; John F. Hern, Southfield, both of Mich.

[73] Assignee: Massey-Ferguson Inc., Detroit, Mich.

[21] Appl. No.: 813,042

[22] Filed: Jul. 5, 1977

[51] Int. Cl.² .............................................. E05C 3/26
[52] U.S. Cl. .................................... 292/216; 292/231
[58] Field of Search ............... 292/216, 280, DIG. 24, 292/DIG. 25, 231, 238

[56] References Cited

U.S. PATENT DOCUMENTS

| 2,877,039 | 3/1959 | Krause | 292/216 |
| 3,848,911 | 11/1974 | Watermann et al. | 292/216 |
| 3,905,626 | 9/1975 | Myers | 292/216 |

Primary Examiner—Richard E. Moore
Attorney, Agent, or Firm—William R. Nolte

[57] ABSTRACT

Window latching apparatus for securing a cab window above the head of an operator includes a rotatable cam mounted to a side roof rail of the cab. A pin projecting from frame of window engages a slot in the cam. Lever means including spring biasing means are provided to interlock with cam to retain window in safely stowed position overhead of the operator.

10 Claims, 8 Drawing Figures

WINDOW LATCH

This invention relates to window latching arrangements and more particularly to window latching arrangements for windows in cabs of industrial tractors in which the windows open inwardly within the confines of the cab.

Ventilation in enclosed tractor cabs has been provided in a variety of ways, for example, by merely bodily lifting a window from its frame and resting the same on edge on the floor of the cab. In other instances a hinged window was moved outwardly in the manner of a canopy or an awning and retained in place by hinged arms which were locked in place by clamping nuts. These various arrangements have proved to be disadvantageous in that in one instance the loose window on the floor created safety problems due to shifting when the tractor was subjected to jolts and vibrations and in other instances the window projecting outside the cab interfered with operating structures of the tractor such as the boom of the backhoe structure.

It is an object of this invention, therefore, to provide an improved latching apparatus for fixedly securing windows in a ventilating position within a tractor cab in a manner which avoids one or more of the disadvantages of prior art arrangements and which has improved safety features.

It is another important object of this invention to provide an improved latching device for retaining an inwardly swinging window within the confines of a cab of an industrial tractor into an open ventilating position, and to secure the same against inadvertent release to thereby avoid possible injury to the operator.

It is another important object of this invention to provide an improved latching arrangement for retaining an inwardly swinging window in an open-overhead position by means of dual latching elements which engage opposite margins of the windows, and wherein each is operable independently of the other to provide inadvertent release of the window and to thereby provide a high degree of safety to the operator.

In accordance with the invention the improved window latching apparatus of the present invention is operable to maintain an inwardly and upwardly swingable window member on a position overhead of the operator and to latch the same against inadvertent release. For this purpose cam means are pivotally mounted to side roof rails of the cab. Pin means affixed to the frame of the window are engageable with a slot in the cam lever means are also provided to interlock with the cam when the latter is in its fully operative position. Biasing means connected to said lever means and said frame are operative to normally retain said lever and said cam in interlocked position to thereby retain the window in a safely stowed position overhead of the operator.

For a better understanding of the invention, together with other and further objects there of, reference is had to the following description taken in conjunction with the accompanying drawings and its scope will be pointed out in the appended claims.

In the drawing FIG. 1 is a perspective view of a cab of the type employed on industrial tractors and embodying the latching apparatus of the present invention and showing a hinged window positioned to an overhead phantom line position;

Figure 1:
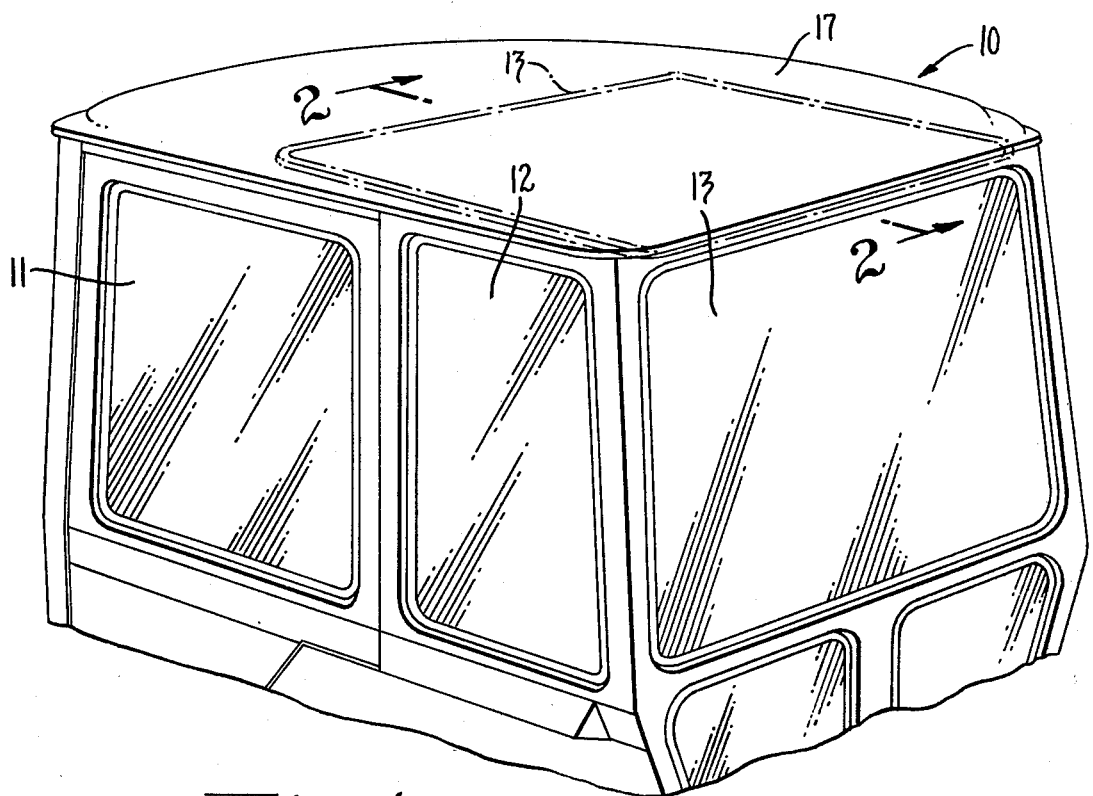

Referring to FIG. 1 of the drawings there is shown a form of cab 10 used on an industrial type tractor not illustrated. The cab includes side windows 11, 12 and an end window 13. The latter is adapted to be pivoted inwardly within the interior of the cab and retained in an open operative position as indicated in the phantom line position of the window 13. The window is withdrawn inwardly rather than pivoted outwardly to provide greater latitude or maneuverability to the operating components of the tractor and for example permits swinging the boom of a backhoe of such a tractor into close proximity to the end of the cab.

Figure 5:
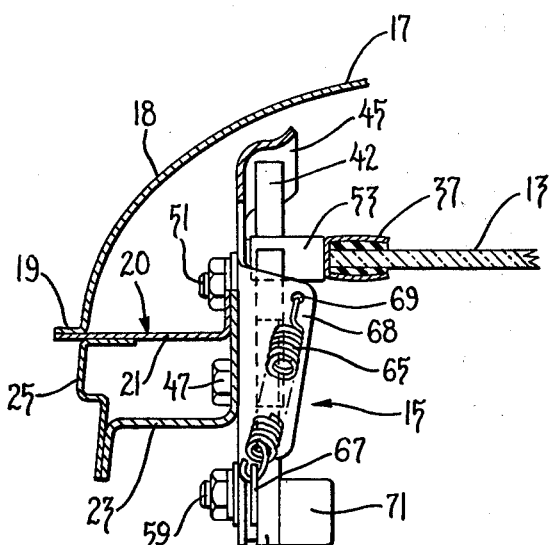
FIG. 5 is a sectional view taken along the lines 5—5 of FIG. 2 illustrating a rear elevational view of the latching apparatus.
Figure 4:
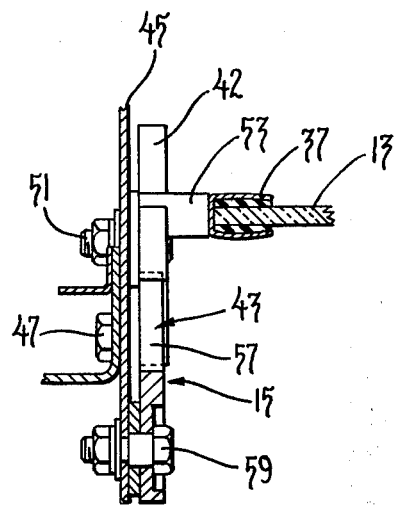
FIG. 4 is a vertical sectional view taken through the lines 4—4 of FIG. 3 taken through the bellcrank pivot and latch supporting bracket of the apparatus.

With further reference to FIGS. 2 to 5 inclusive of the drawings the latching apparatus 15 of the present invention is shown supporting the rear window 13 in an operative position above the head of the operator within the cab so that the window lies beneath the plane of the roof 17 of the cab. As seen in FIG. 5 the side edge portion of the roof curves downwardly as at 18 and terminates with a horizontal flange 19 which in turn is suitably secured to a fore and aft disposed side roof rail 20. The latter roof rail consists of a top horizontal member 21, a bottom z-shaped member 23, and a side channel member 25 suitably joined at their respective margins to define a box section. The structural configuration of the cab forms no part of the present invention. The cab roof structure also includes a transverse rail 31, see FIG. 2, of similar construction and consisting of a top horizontal member 32, a curved outer channel member 33 and an inner angle member 34 likewise suitably joined to define a rigid box structure and which provides hinged support for rear window 13. The latter is also of conventional construction and includes a hinged frame 37 which is interconnected at its top margin by a suitable hinge 39 to angle 34 of the transverse roof rail 31. The hinge 39 enables the operator to swing the window from its generally vertical closed position shown in phantom line construction FIG. 2 to a horizontally disposed latched position above the head of the operator.

Figure 3:
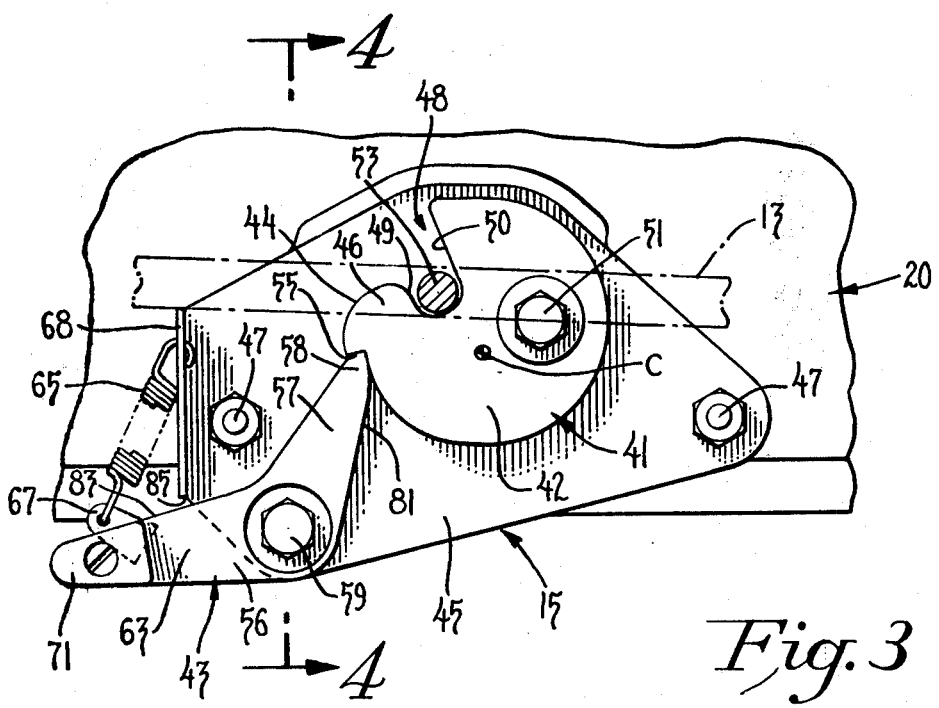
FIG. 3 is an enlarged fragmentary portion of FIG. 2 and illustrating the latching apparatus of the present invention in greater detail.

In order to safely secure the window in such latched position, the aforementioned improved latching apparatus 15 of the present invention is provided with cam means 41 and locking means 43 both pivotally mounted upon a supporting plate 45, the latter in turn being suitably secured as by bolts 47 to fore-and-aft disposed side rail 20. Cam means 41 are provided which comprise a generally circular plate 42 with an approximate radially disposed notch 48, and a head portion 46 adjacent the notch. Pivot means 51 which may include a suitable bearing engage the cam plate 42 and secure the same to mounting plate 45. The pivot is offset from the center of plate 42 in a direction away from the head 46. The approximate location of the center of gravity of the plate 42 indicated as at C, and as seen in FIG. 3, lies intermediate pivot 51 and the head portion 46 of the cam. The notch is of generally U-shaped configuration and includes opposed side edge surfaces 49, 50 which embrace pin 53 which projects outwardly from side edge of frame 37 of window 13. The cam plate 42 includes a shoulder 55 adjacent the head 46. The aforementioned locking means 43 includes a lever or bellcrank 56 pivoted to the mounting bracket as at 59. The tip portion 58 of upright arm 57 engages shoulder 55 of the cam.

Lever 56 includes a generally horizontally disposed arm 63 which is connected to one end of spring 65 by means apertured clip 67 suitably secured to the arm. The upper end of the spring 65 is threaded into aperture 69 of inturned flange 68 of mounting bracket 45. The spring urges lever 56 into clockwise rotation such that in the swing-up position of window 13, tip 58 of the lever is in locked engagement with shoulder 55 of cam 42. The outer extremity of lever arm 63 included a hand grip or handle portion as at 71 to enable the operator to rotate the lever in a counterclockwise direction against the normal clockwise bias of spring 65.

Figure 2:
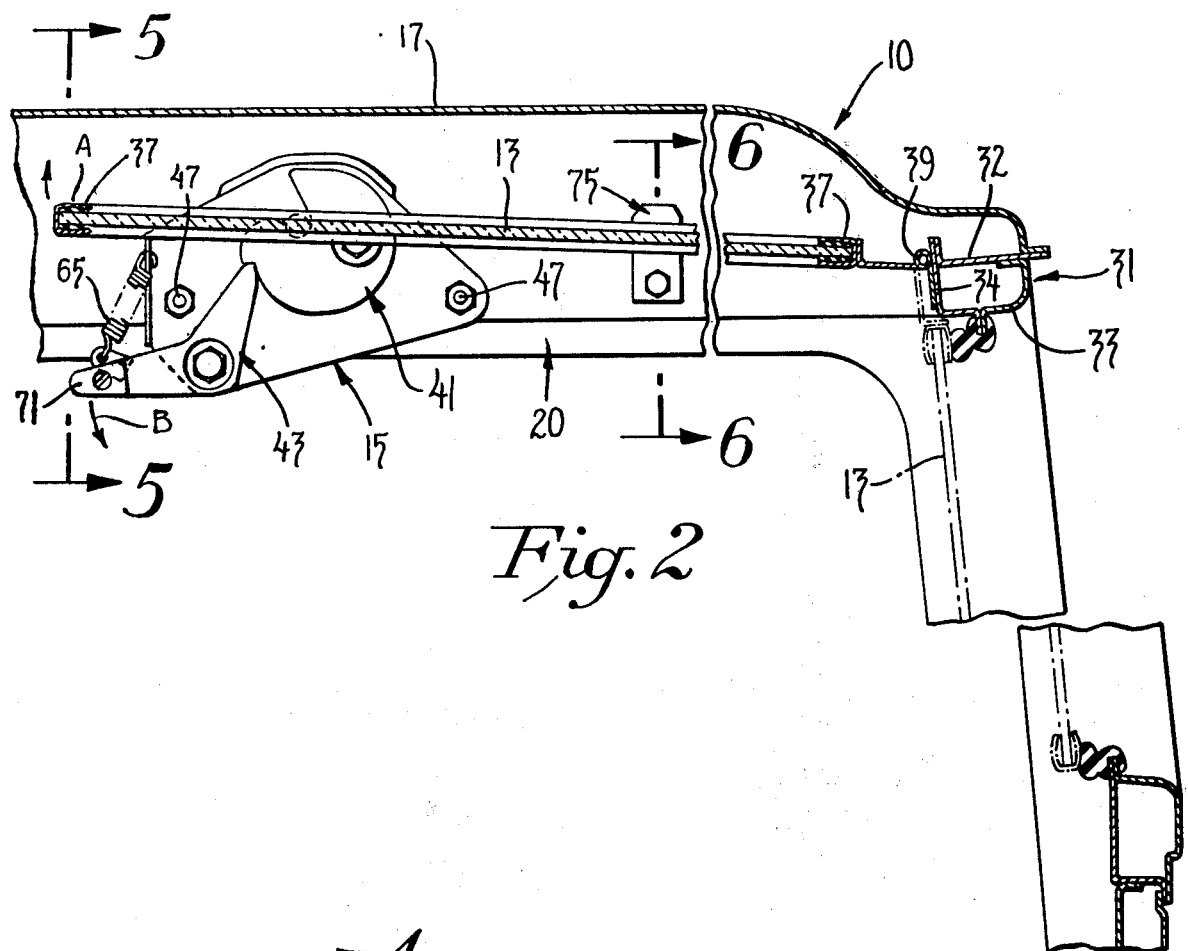
FIG. 2 is a fore and aft longitudinal sectional view of the cab taken along the lines 2—2 of FIG. 1 and illustrating the latching apparatus of the present invention in side elevation.
Figure 6:
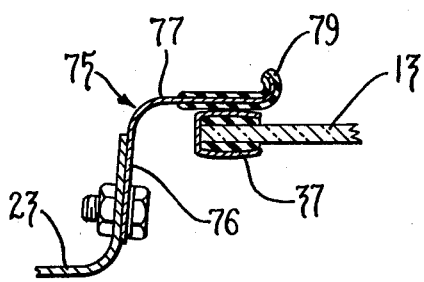
FIG. 6 is a sectional view taken along the lines 6—6 of FIG. 2 and illustrating means for damping vibration of the window when the latter is in its latched operative position.

Referring now to FIG. 2 a spring 75, of right angle shape, is provided to engage window 13 in its swing-up or latched position. The spring is secured to side rail 20 intermediate hinge 39 and latch apparatus 15 to damp movement of the window when it is in its latched position when the tractor is in motion and the cab is subjected to jolts and vibrations during its normal course of operation. As best seen in FIG. 6 the vertical arm 76 of the spring is secured to the vertical arm of the side sill member 23. The horizontal arm 77 of the spring serves along with the latching assembly 15 to limit upper movement of window 13 and in FIG. 6 is shown in contact with the upper surface of frame 37. The end of the arm 77 is suitably coated with resilient material 79 to minimize contact noise and to damp vibration of the window.

Figure 8:
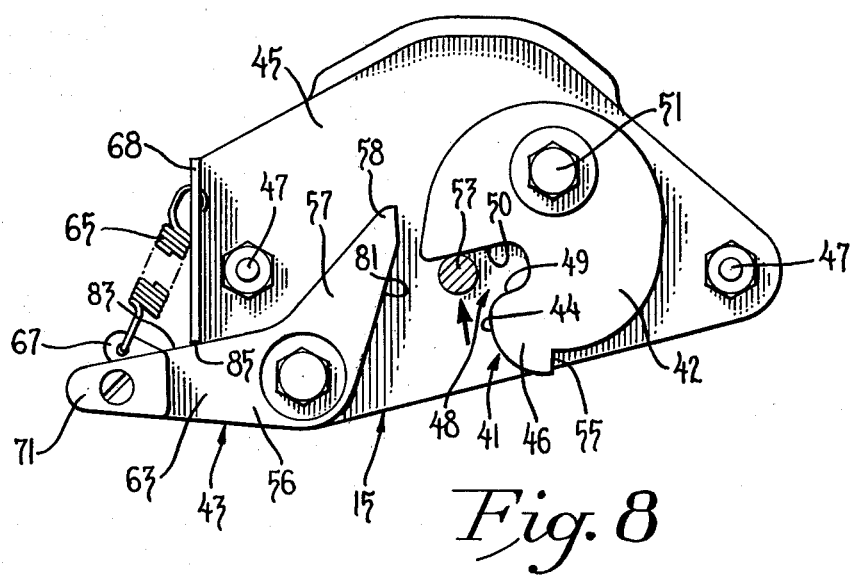
FIG. 8 is a side elevational view of the latching apparatus similar to that shown in FIG. 7 but showing further positions of the various parts thereof.
Figure 7:
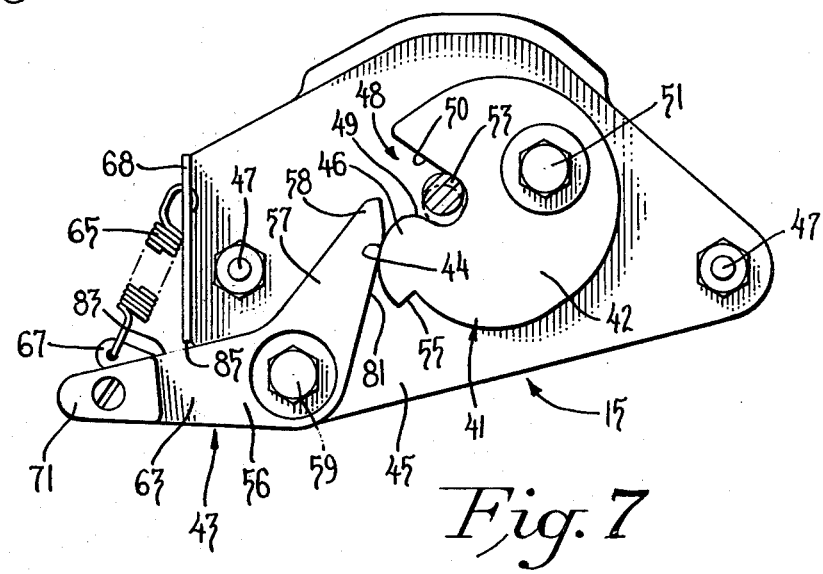
FIG. 7 is a side elevational view of the latching appartus similar to that shown in FIG. 3 but illustrating the apparatus in an open operative state.

The operation of the improved window latching apparatus of the present invention will be understood from the afore-described figures as follows: With window 13 in its down position as illustrated in FIG. 1 and with cam 42 rotated to its counterclockwise position shown in FIG. 8, the operator grasps and swings the window upwardly about hinge 39 to a generally horizontal position. Pin 53 of window frame 37 coacts with cam edge 50 of cam 42 to rotate the latter in a clockwise position under the action of spring 65. With further upward swinging movement of window 13, pin 53 rides cam surface 50 to the base of the notch 48 thereby rotating the cam to the position illustrated in FIG. 7, and so that, head portion 44 of the cam engages cam edge 81 of arm 57 to thereby rotate lever 43 counterclockwise against the biasing action of spring 65. Upon still further upward movement of the window 13 cam plate 42 is rotated clockwise until tip 58 of arm 57 drops into locking engagement with shoulder 55 of the cam and is safely retained in a locked engagement therewith under the biasing action of spring 65. The auxiliary spring 75, FIG. 2, in the latched position of window 13, engages the side frame 37, at window 13 intermediate hinge 39 and latching assembly 15, to exert a downward snugging action and to damp vibrations transmitted to the window while the tractor is in motion.

To lower the window from its latched operative position shown in FIG. 2 the operator with one hand lifts the free end A of the window to release the window loading on the latching mechanism. Thereafter the operator with his other hand grasps the handle 71 of bellcrank 43 and rotates the same counterclockwise in the direction of arrow B. The operator may then gently lower the window in a manner, see FIG. 7, to enable shoulder 55 of cam 42 to clear tip 58 of lever 43 so that head portion 44 of cam 43 engages edge surface 81 of arm 57. Since a preferred embodiment of this invention employs latching elements 15 on each side of the cab to engage opposite sides of window frame 37 the operator performs a similar operation for the second of oppositely disposed latching mechanism 15 not illustrated. Thereafter the operator continues to lower the window 13 which in turn causes pin to ride the lower cam edge 49 of slot 48 of the cam which imparts successive counterclockwise rotation of cam 42 until the latter again assumes the position shown in FIG. 8. Handle 71 which will have been released in the meantime will enable lever 43 to be rotated in a clockwise direction so that the upper edge 83 engages stop 85 constituted by the lower edge of inturned flange 68 of mounting bracket 45. The window may thereafter be lowered to its vertical position so that the same may be fastened in its closed position as shown in FIG. 1.

While there have been described what at present are considered to be the preferred embodiments of this invention, it will be obvious to those skilled in the art that various changes and modifications may be made therein without departing from the invention, and it is, therefore, armed in the appended clause to cover all such changes and modifications as fall within the spirit and scope of the invention.

We claim:

1. Latching apparatus for securing a window movable between a closed vertical position and a horizontal latch position within a cab, a roof on the cab and the latch position of said window being beneath the roof of the cab, comprising: cam means and an eccentric axis pivotally mounting said cam means to said roof to cause said cam means to gravitate to an engaging position whenever released from the latch position, pin means interconnecting said window and said cam means by engagement therewith upon movement of said window therepast, and lever means engageable with said cam means to lock said cam means and said window in the horizontally latched position, said lever means including an arm, said cam means including a shoulder, first and second points on said shoulder, said first point on a closer radius to said cam pivot and the said second point, said arm engaging said shoulder at said first point in the locked position at a distance between said first point and the pivot of said lever greater than the distance between said second point and the pivot of said lever to require raising of said cam means having the weight of the window thereon to permit said lever arm to pass said second point to reach the release position.

2. In the latching apparatus as set forth in claim 1 wherein said pin interconnecting means includes a pin projecting from said window and further, wherein said cam means define a slot to embrace said pin.

3. In the latching apparatus as set forth in claim 1 wherein said cam means defines a stepped portion constituting a shoulder and wherein said lever means include an extremity engageable with said shoulder to thereby limit rotation of said cam and said window in one direction of rotation.

4. In the latching apparatus as set forth in claim 3 wherein said lever means include spring means connected to said lever means to normally bias the same to coact with said cam means.

5. In the latching apparatus as set forth in claim 4, wherein mounting plate means are provided to pivotally mount said cam means and said lever means to said roof.

6. In the latching apparatus as set forth in claim 5 wherein said spring means are secured to said lever means and to said mounting plate means to normally urge said lever means into locking engagement with said cam means.

7. In the latching apparatus as set forth in claim 6 wherein said mounting plate means includes flange means for securing one extremity of said spring means and wherein said flange means constitute an abutment for limiting travel of said lever means in one direction of rotation.

8. In the latching apparatus as set forth in claim 3 wherein said cam means constitutes a planar member and wherein said slot means include a pair of opposed marginal edges, one edge of said pair projecting radially outwardly beyond said other edge to engage said lever means and move said lever to engage said shoulder, said other edge passing freely by said lever means.

9. The latching apparatus as set forth in claim 1 including a second latching apparatus, said first apparatus on one side of said window and the second on the other side of said window.

10. Latching apparatus for securing a window movable between a closed vertical position and a horizontal latch position within a cab, a roof on the cab and the latch position of said window being beneath the roof of the cab, comprising: cam means and an eccentric axis pivotally mounting said cam means to said roof to cause said cam means to gravitate to an engaging position whenever released from the latch position, pin means interconnecting said window and said cam means by engagement therewith upon movement of said window therepast, and lever means engageable with said cam means to lock said cam means and said window in the horizontally latched position, and mounting plate means for pivotally mounting said cam means and said lever means to the roof, said lever structure including spring means secured to said mounting plate and to said lever means to urge said lever means into locking engagement with said cam means.

* * * * *